US 9,027,048 B2

(12) United States Patent
Jones et al.

(10) Patent No.: US 9,027,048 B2
(45) Date of Patent: May 5, 2015

(54) AUTOMATIC DEAL OR PROMOTION OFFERING BASED ON AUDIO CUES

(71) Applicant: Bank of America, Charlotte, NC (US)

(72) Inventors: Alicia C. Jones, Fort Mill, SC (US); James E. Burgess, Charlotte, NC (US); Matthew Perkins, Charlotte, NC (US); Sean M. Jones, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 99 days.

(21) Appl. No.: 13/676,983

(22) Filed: Nov. 14, 2012

(65) Prior Publication Data

US 2014/0137139 A1    May 15, 2014

(51) Int. Cl.
*H04H 60/29* (2008.01)
*H04N 21/458* (2011.01)
*H04N 21/439* (2011.01)

(52) U.S. Cl.
CPC ......... *H04N 21/458* (2013.01); *H04N 21/4394* (2013.01)

(58) Field of Classification Search
CPC ................... H04N 21/458; H04N 21/4394
USPC ...................... 725/5, 9, 18, 19, 46
See application file for complete search history.

(56) References Cited

U.S. PATENT DOCUMENTS

| | | | |
|---|---|---|---|
| 5,155,591 A | 10/1992 | Wachob | |
| 5,594,779 A | 1/1997 | Goodman | |
| 5,636,346 A | 6/1997 | Saxe | |
| 5,694,455 A | 12/1997 | Goodman | |
| 6,119,098 A | 9/2000 | Guyot et al. | |
| 6,182,050 B1 | 1/2001 | Ballard | |
| 6,184,926 B1 | 2/2001 | Khosravi et al. | |
| 6,269,173 B1 | 7/2001 | Hsien | |
| 6,298,330 B1 | 10/2001 | Gardenswartz et al. | |
| 6,385,592 B1 | 5/2002 | Angles et al. | |
| 6,404,900 B1 | 6/2002 | Qian et al. | |
| 6,408,278 B1 | 6/2002 | Carney et al. | |
| 6,484,148 B1 | 11/2002 | Boyd | |
| 6,553,345 B1 | 4/2003 | Kuhn et al. | |
| 6,643,620 B1 | 11/2003 | Contolini et al. | |

(Continued)

OTHER PUBLICATIONS

Shazam [online] [retrieved on Nov. 26, 2012]. Retrieved from the Internet< URL: http://www.engagetv.tv/?portfolio=shazam-super-bowl>.

(Continued)

*Primary Examiner* — Nasser Goodarzi
*Assistant Examiner* — Michael B Pierorazio
(74) *Attorney, Agent, or Firm* — Banner & Witcoff, Ltd.; Michael A. Springs

(57) ABSTRACT

Aspects herein describe at least a new method, system, and computer readable storage media for recognizing the content of the audio. A computing device determines whether the content comprises a product and/or service, correlates the product and/or service with one or more promotional deals provided by an organization such as a financial institution, generates a subset of the one or more promotional deals based on the correlation, and transmits the subset to a multimedia viewing device such as a television. The subset of the one or more promotional deals may be viewed by a viewer. The one or more promotional deals are displayed on a portion of the screen of the television for viewing by the viewer. The viewer may make a purchase decision based on the one or more promotional deals displayed.

20 Claims, 6 Drawing Sheets

(56) References Cited

U.S. PATENT DOCUMENTS

| | | | |
|---|---|---|---|
| 6,785,906 B1 | 8/2004 | Gaughan et al. | |
| 6,889,325 B1* | 5/2005 | Sipman et al. | 713/176 |
| 6,904,168 B1 | 6/2005 | Steinberg et al. | |
| 7,047,554 B1 | 5/2006 | Lortz | |
| 7,152,163 B2 | 12/2006 | Mihcak et al. | |
| 7,319,779 B1 | 1/2008 | Mummareddy et al. | |
| 7,383,203 B1 | 6/2008 | Feldstein et al. | |
| 7,508,535 B2 | 3/2009 | Hart et al. | |
| 7,640,272 B2 | 12/2009 | Mahajan et al. | |
| 7,653,921 B2* | 1/2010 | Herley | 725/19 |
| 7,921,036 B1 | 4/2011 | Sharma et al. | |
| 7,991,770 B2* | 8/2011 | Covell et al. | 707/722 |
| 8,190,435 B2* | 5/2012 | Li-Chun Wang et al. | 704/270 |
| 8,290,423 B2* | 10/2012 | Wang | 455/2.01 |
| 8,650,603 B2* | 2/2014 | Doets et al. | 725/94 |
| 8,688,600 B2* | 4/2014 | Barton et al. | 705/500 |
| 8,725,829 B2* | 5/2014 | Wang et al. | 709/217 |
| 8,811,885 B2* | 8/2014 | Wang | 455/2.01 |
| 2002/0016740 A1 | 2/2002 | Ogasawara | |
| 2002/0072982 A1* | 6/2002 | Barton et al. | 705/26 |
| 2003/0018475 A1 | 1/2003 | Basu et al. | |
| 2003/0110038 A1 | 6/2003 | Sharma et al. | |
| 2003/0225825 A1 | 12/2003 | Healey et al. | |
| 2004/0199387 A1* | 10/2004 | Wang et al. | 704/243 |
| 2005/0010409 A1 | 1/2005 | Hull et al. | |
| 2005/0028195 A1* | 2/2005 | Feinleib et al. | 725/32 |
| 2005/0091274 A1* | 4/2005 | Stanford | 707/104.1 |
| 2005/0144455 A1* | 6/2005 | Haitsma | 713/176 |
| 2005/0192863 A1* | 9/2005 | Mohan | 705/14 |
| 2005/0243166 A1 | 11/2005 | Cutler | |
| 2005/0243168 A1 | 11/2005 | Cutler | |
| 2006/0206912 A1 | 9/2006 | Klarfeld et al. | |
| 2006/0224452 A1* | 10/2006 | Ng | 705/14 |
| 2006/0256133 A1* | 11/2006 | Rosenberg | 345/619 |
| 2007/0118873 A1 | 5/2007 | Houh et al. | |
| 2007/0124756 A1* | 5/2007 | Covell et al. | 725/18 |
| 2007/0130580 A1* | 6/2007 | Covell et al. | 725/18 |
| 2007/0143778 A1* | 6/2007 | Covell et al. | 725/19 |
| 2007/0179850 A1* | 8/2007 | Ganjon et al. | 705/14 |
| 2007/0192784 A1* | 8/2007 | Postrel | 725/23 |
| 2007/0214049 A1* | 9/2007 | Postrel | 705/14 |
| 2008/0052062 A1* | 2/2008 | Stanford | 704/8 |
| 2008/0140385 A1 | 6/2008 | Mahajan et al. | |
| 2008/0146234 A1 | 6/2008 | Kim | |
| 2008/0243614 A1 | 10/2008 | Tu et al. | |
| 2009/0198701 A1* | 8/2009 | Haileselassie et al. | 707/10 |
| 2009/0313670 A1* | 12/2009 | Takao | 725/110 |
| 2010/0034466 A1* | 2/2010 | Jing et al. | 382/195 |
| 2010/0114713 A1* | 5/2010 | Anderson | 705/14.69 |
| 2011/0273455 A1* | 11/2011 | Powar et al. | 345/473 |
| 2011/0289114 A1 | 11/2011 | Yu et al. | |
| 2012/0011545 A1* | 1/2012 | Doets et al. | 725/38 |
| 2012/0076310 A1* | 3/2012 | DeBusk et al. | 381/56 |
| 2012/0124608 A1* | 5/2012 | Postrel | 725/23 |
| 2012/0191231 A1* | 7/2012 | Wang | 700/94 |
| 2012/0221131 A1* | 8/2012 | Wang et al. | 700/94 |
| 2012/0295560 A1* | 11/2012 | Mufti | 455/95 |
| 2012/0297400 A1* | 11/2012 | Hill et al. | 719/318 |
| 2012/0316969 A1* | 12/2012 | Metcalf, III | 705/14.66 |
| 2012/0317240 A1* | 12/2012 | Wang | 709/219 |
| 2013/0010204 A1* | 1/2013 | Wang | 348/725 |
| 2013/0029762 A1* | 1/2013 | Klappert | 463/31 |
| 2013/0031579 A1* | 1/2013 | Klappert | 725/32 |
| 2013/0042262 A1* | 2/2013 | Riethmueller | 725/14 |
| 2013/0044051 A1* | 2/2013 | Jeong | 345/156 |
| 2013/0067512 A1* | 3/2013 | Dion et al. | 725/34 |
| 2013/0073366 A1* | 3/2013 | Heath | 705/14.25 |
| 2013/0073377 A1* | 3/2013 | Heath | 705/14.39 |
| 2013/0080242 A1* | 3/2013 | Alhadeff et al. | 705/14.39 |
| 2013/0080262 A1* | 3/2013 | Scott | 705/14.68 |
| 2013/0085828 A1* | 4/2013 | Schuster | 705/14.25 |
| 2013/0111519 A1* | 5/2013 | Rice et al. | 725/34 |
| 2013/0124073 A1* | 5/2013 | Ren | 701/118 |
| 2014/0214532 A1* | 7/2014 | Barton et al. | 705/14.49 |
| 2014/0278845 A1* | 9/2014 | Teiser et al. | 705/14.4 |

OTHER PUBLICATIONS

Shazam Music [online] [retrieved on Nov. 26, 2012]. Retrieved from the Internet<URL: http://www.shazam.com>.

Automatic Content Recognition [online] [retrieved on Nov. 27, 2012]. Retrieved from the Internet<URL: http://www.intrasonics.com/acr.html>.

Ellis, L. TV of Tomorrow 2011 [online], Dec. 12, 2011 [retrieved on Nov. 27, 2012]. Retrieved from the Internet< URL: http://www.translation-please.com/column.cfm?columnid=393>.

Search Report and Written Opinion for International application No. PCT/US13/54704 mailed Sep. 13, 2013.

\* cited by examiner

AUTOMATIC DEAL OR PROMOTION OFFERING BASED ON AUDIO CUES

FIELD

Generally, aspects of the disclosure relate to the automatic content recognition of audio and the promotion of products associated with the content.

BACKGROUND

When a person watches a television program, the person may be interested in one or more products and/or services associated with the television program. Often, such products and/or services may be of interest to a person because there may be a correlation between the person's interest in the television program and the products and/or services associated with the program.

Therefore, while the person may be interested in a particular product and/or service, he or she may not be aware of its availability and/or price. Furthermore, he or she may want to make an immediate purchase decision if possible.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

Aspects herein describe new methods and systems for providing a deal or offering based on audio content recognition.

Additionally, aspects herein describe at least a method, system, and computer readable storage media for recognizing the content of audio by a server of an organization. The server further determines whether the content comprises one of a product and a service, correlates one of the product and the service with one or more deals provided by an organization, generates a subset of the one or more deals, and transmits the subset to a television or viewing device. The one or more deals are displayed on a portion of the screen of the television or the viewing device. A viewer may make a purchase decision based on the one or more deals displayed.

The various aspects of the illustrative embodiments are substantially shown in and/or described in connection with at least one of the following figures, as set forth more completely in the claims.

These and other advantages, aspects, and novel features of the present disclosure, as well as details of illustrated embodiments, thereof, will be more fully understood from the following description and drawings.

BRIEF DESCRIPTION OF THE DRAWINGS

Figure 1:
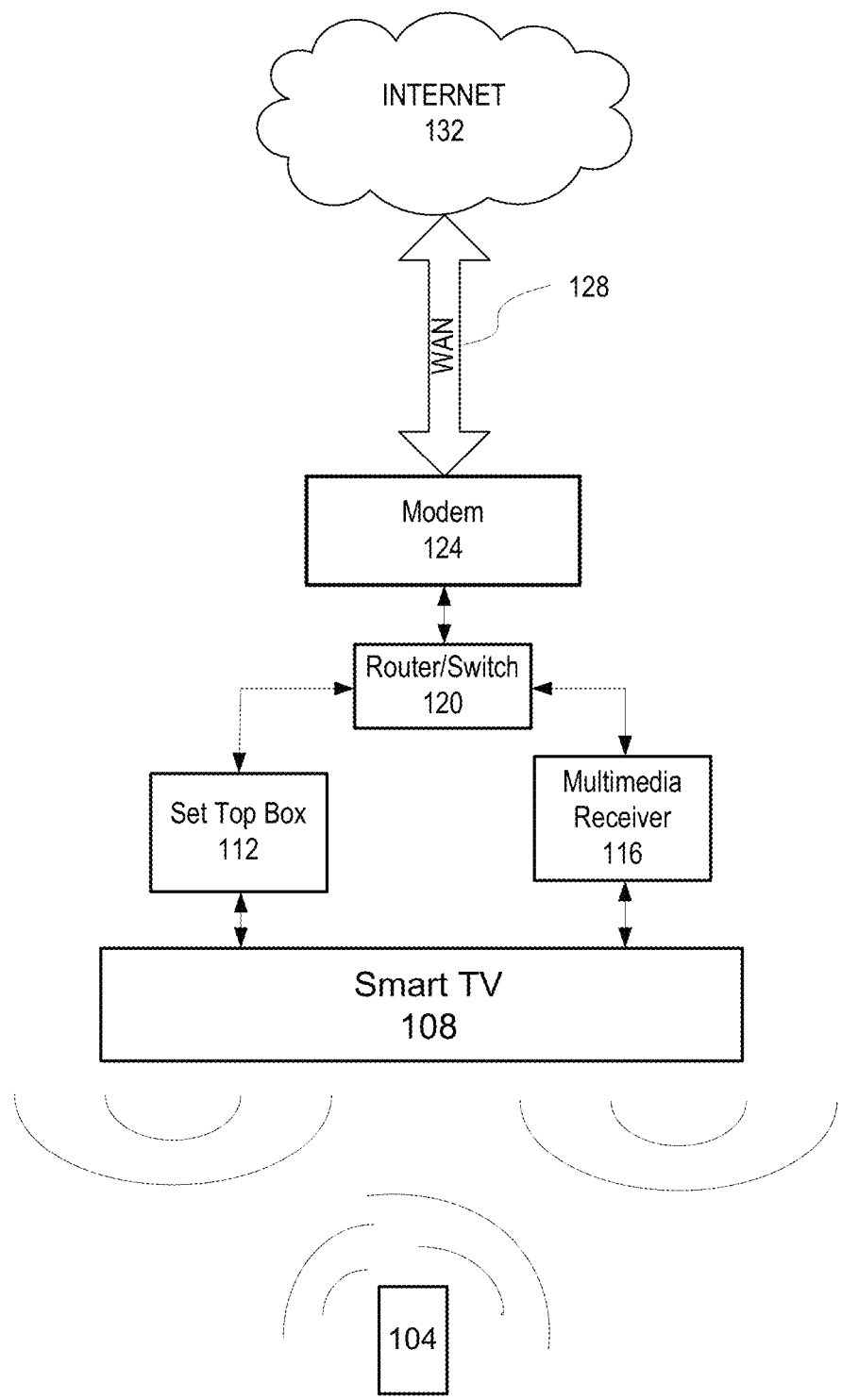

Having thus described aspects of the disclosure in general terms, reference will now be made to the accompanying drawings, which are not necessarily drawn to scale, and wherein:

FIG. 1 illustrates an operating environment in which various aspects of the disclosure may be implemented.

Figure 2:
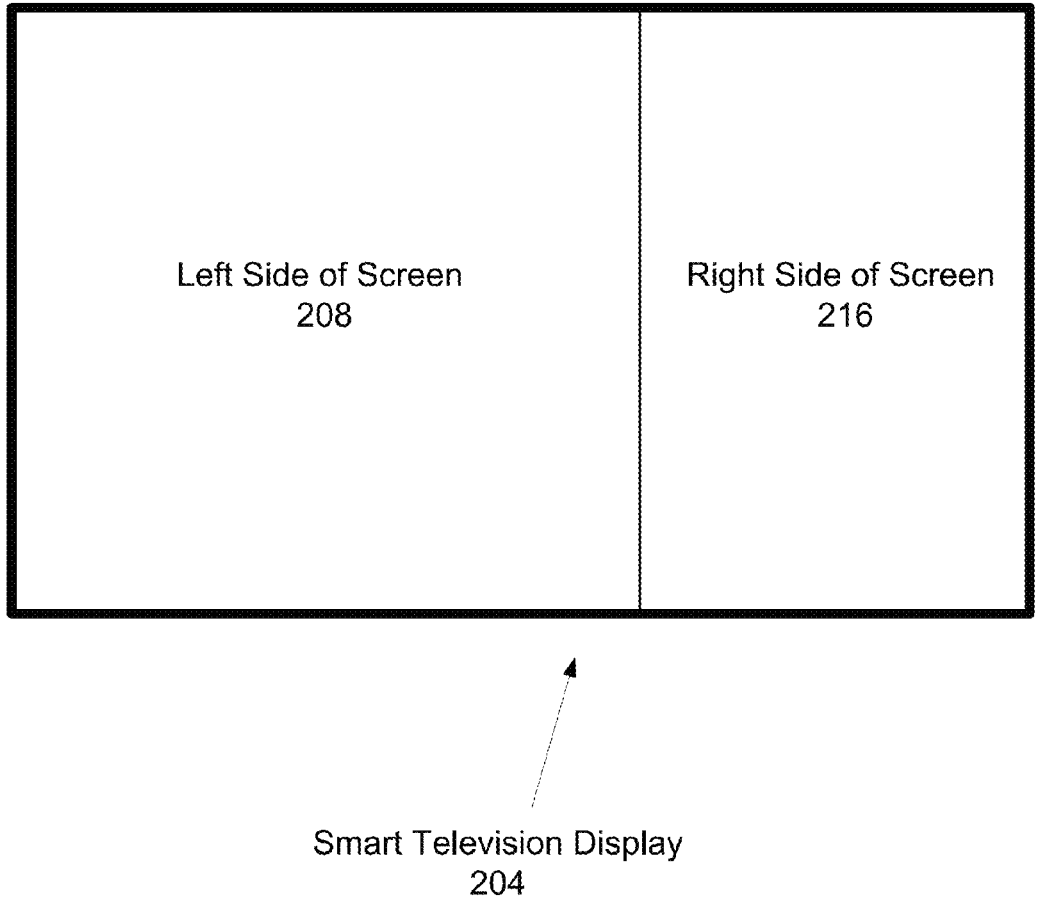

FIG. 2 is a block diagram of the display of the smart TV described in connection with FIG. 1 in accordance with an embodiment of the disclosure.

Figure 3:
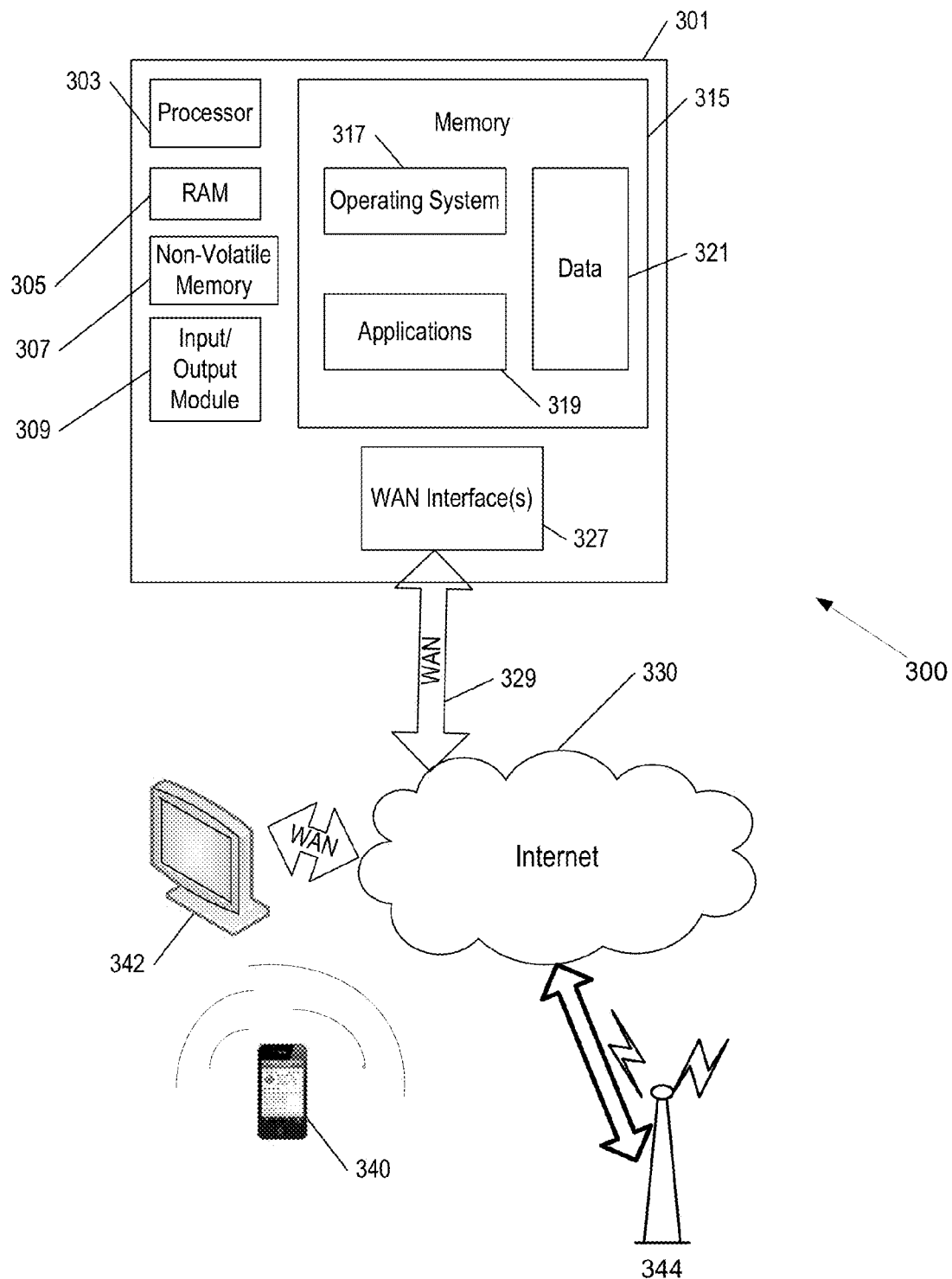

FIG. 3 is a block diagram of a suitable computing system environment that may be used to provide data corresponding to one or more products and/or services that may be of interest to a user of the smart TV and/or the wireless communication device previously described in connection with FIG. 1, in accordance with an exemplary embodiment.

Figure 4A:
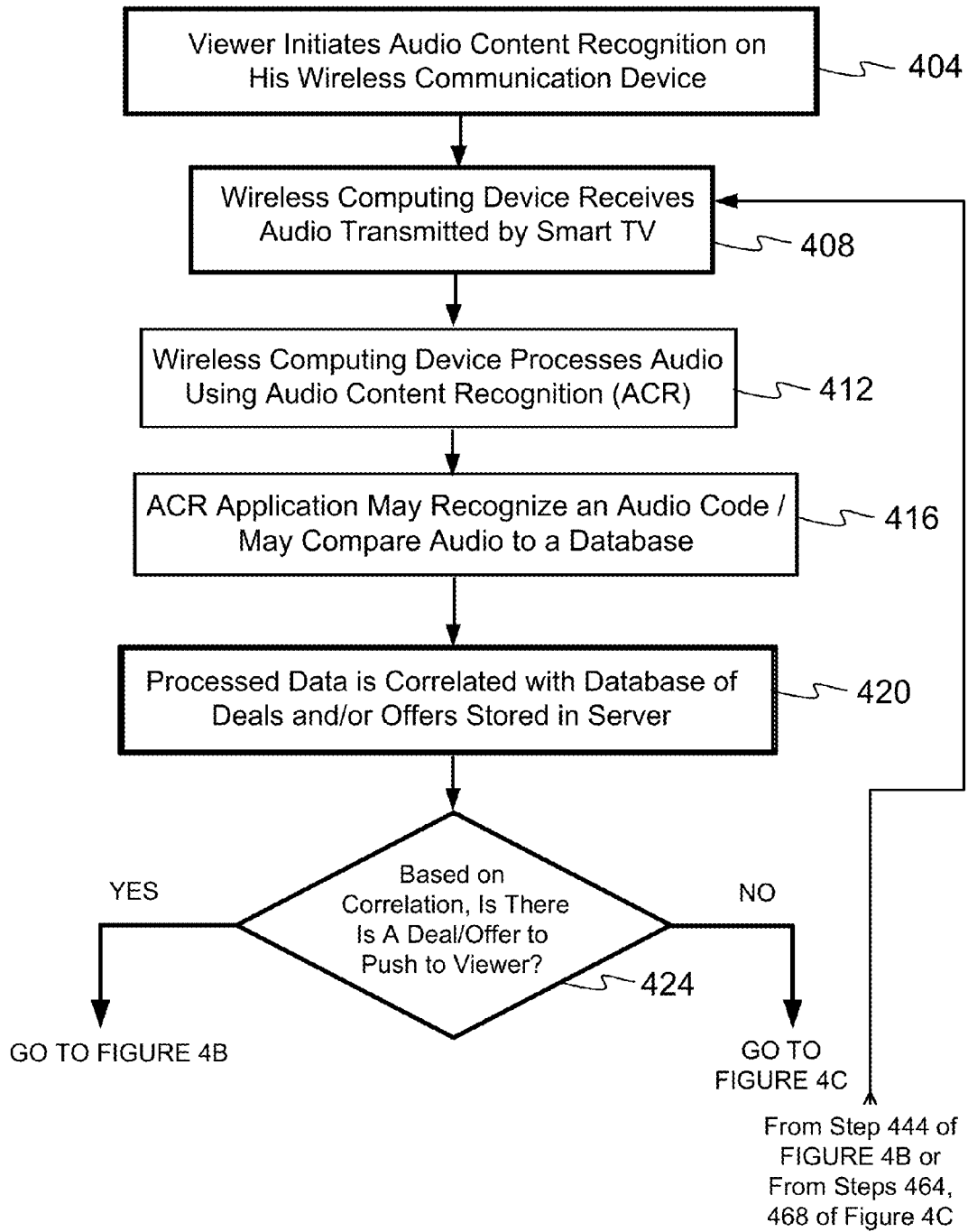
Figure 4B:
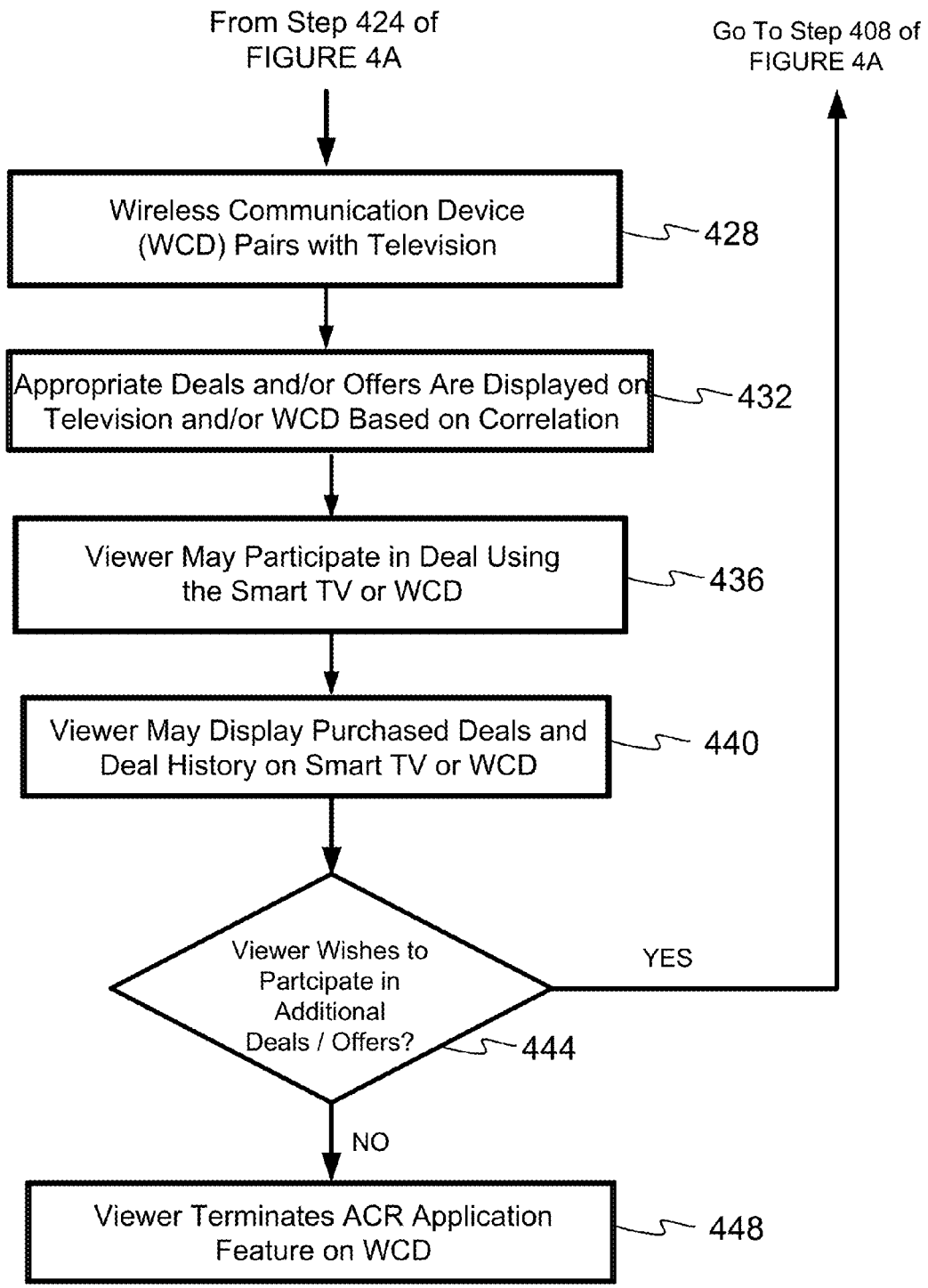
Figure 4C:
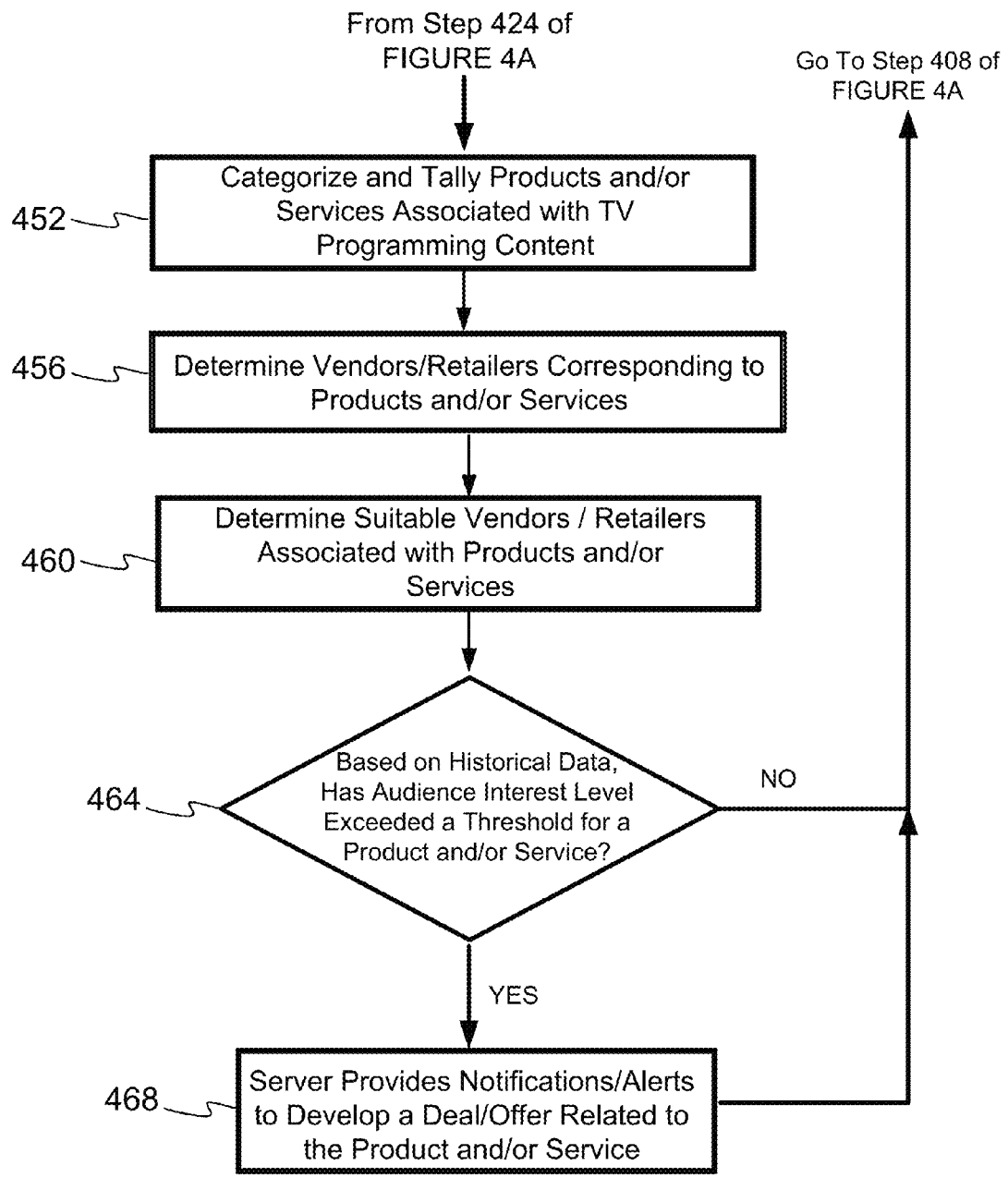

FIGS. 4A, 4B, and 4C are operational flow diagrams illustrating how audio content recognition is used to automatically display products and services of interest to a viewer on a display of a computing device.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

Various aspects described herein may be embodied as a method, a data processing system or apparatus, or a computer program product. Accordingly, those aspects may take the form of an entirely hardware embodiment, an entirely software embodiment, or an embodiment combining software and hardware aspects. Furthermore, such aspects may take the form of a computer program product stored in one or more computer-readable storage media having computer-readable program code, or instructions, embodied in or on the storage media. Any suitable computer readable storage media may be utilized, including magnetic hard disk drives, optical discs such as CDs and DVDs, and/or other optical media or optical drives, NAS (network attached storage) devices, and/or any combination thereof. In addition, various signals, such as one or more digital signals, may comprise data (uncoded, coded, or encrypted) that may be transmitted between computing devices. The computing devices may comprise a digital appliance such as a smart television (TV), a desktop computer, laptop computer, and one or more portable wireless computing devices (e.g., a smartphone, cellphone, PDA, notebook, notepad), or any kind of computing device comprising a processor and memory which is capable of executing firmware and/or software.

FIG. 1 illustrates an example operating environment in which various aspects of the disclosure may be implemented. The operating environment may include a wireless communication device 104, a smart television or other suitable viewing device 108, a set top box 112, a multimedia receiver 116, a router/switch 120, and a modem 124. The wireless communication device 104 may be communicatively coupled to smart television 108 by way of a wireless data communications link. The wireless communication device 104 may communicate to the smart television (TV) 108 by using one or more wireless communications protocols including Wi-Fi, Bluetooth, NFC, and the like. Each of the wireless communication device 104 and the smart TV 108 may comprise a transceiver and antenna.

The data may comprise one or more control signals, commands, applications, a movie, a slide show, a picture, or any other media, for example. The control signals and commands may comprise data used for authenticating the wireless communication device 104 with the smart TV 108. The wireless communication device (WCD) 104 may transmit commands and/or control signals to pair itself with the smart TV 108. As illustrated, the smart TV 108 may be connected to the set top box 112 and a multimedia receiver 116.

The smart TV 108 may comprise a display, a microphone, and a camera. The microphone and camera may be utilized when the smart TV operates in a voice and gesture control mode. The smart TV 108 may be able to authenticate a user by way of recognizing the facial features of the user. The smart TV 108 may execute facial recognition software to perform facial recognition of the viewer of the smart TV and/or user of the wireless communication device. The smart TV 108 may be able to authenticate a command uttered by a user when the audio signal received by the microphone is analyzed and determined to be characteristic of the user.

Authentication of the viewer or user may be performed using facial recognition and/or audio recognition. The frequency components of the audio signal may be used to characterize a user's voice, for example. While being able to recognize the facial features of a viewer or user, the camera may also be used in gesture control mode to receive gesture based commands made by the user or viewer. A user, who has been authenticated using facial recognition, may be able to use his or her hand as a cursor to control and select objects on the display of the smart TV 108, for example.

While the set top box 112 may allow for reception of satellite and/or cable based programming, the set top box 112 may also comprise a camera and a microphone which provides for the implementation of voice and gesture control. The multimedia receiver 116 may provide reception of various programming obtained through the Internet. While the multimedia receiver 116 may allow for reception of satellite and/or cable based programming, the multimedia receiver 112 may also comprise a camera and a microphone which may be used to provide voice and gesture control functionality. The multimedia receiver 116 may comprise any receiver capable of downloading streams of multimedia data from the Internet. The multimedia receiver 116 may source the multimedia data from a variety of content providers. The modem 124 may interface with a wide area network (WAN) 128 at one port and with the router/switch at another port. The port at the WAN 128 may comprise a coaxial connection. The port at the router/switch may comprise an Ethernet connection. As illustrated in FIG. 1, the WAN 128 may be communicatively coupled to the Internet 132. While a smart television 108 has been described in the embodiment shown in FIG. 1, the smart television 108 may be alternatively described as a multimedia viewing device. The smart television 108 may comprise any type of computing device, multimedia viewing device, or digital appliance capable of providing video from a display and audio from one or more speakers. The computing device may comprise a computer, such as a personal computer (PC), laptop, notepad, for example, capable of providing online streaming of any multimedia data it receives by way of the Internet 132.

FIG. 2 is a block diagram of the display of the smart TV described in connection with FIG. 1 in accordance with an embodiment of the disclosure. FIG. 2 illustrates an exemplary view or display of the smart TV 204 in a split screen mode comprising two subscreens. The display or screen 204 may be divided or configured into multiple sub-screens in which each sub-screen provides its own programming.

In one embodiment, the display or screen 204 may be divided into a first subscreen and a second subscreen. FIG. 2 illustrates a left side of screen 208 and a right side of screen 216 when the smart TV is operated in a split-screen mode. Normally, the display 204 provides a multimedia program that occupies the entire screen. However, when the smart TV is operated in split-screen mode, the first subscreen or left side of the screen 208 may be used to display the normally scheduled programming while the second subscreen or right side of the screen 216 may be used to display optional or additional programming transmitted to the user or viewer.

The optional or additional programming displayed on the second subscreen may comprise one or more promotional deals or offers associated with the programming displayed on the first subscreen. For example, a home and garden television show, displayed on the first subscreen, may provide information related various appliances presented in its show. When the show describes features of a kitchen, for example, the right side of the screen 216 may be used to provide additional information related to kitchen appliances. For example, a refrigerator, a dishwasher, and range may be shown and/or described in the second subscreen. Furthermore, services such as rug cleaning, plumbing, and housecleaning services may be offered as well. The second subscreen may also provide an offer or deal associated with the appliance. The second subscreen may allow the viewer to select the deal and make a purchase using a remote control. Other arrangements and display orientations are also contemplated.

When gesture control mode is activated, a viewer may facilitate selection and purchase of a deal or offer using his or her hands as a cursor, for example. A purchase may be made using the smart TV by way of keying in an appropriate credit card number, for example. In additional to make a purchase at the price offered by the deal, a transactional discount may be given to any viewer who makes a purchase using a particular credit card. The discount may be given to the purchaser immediately at the time of purchase. Otherwise, for example, the discount may be given to the viewer as a credit on the purchaser's credit card account. The credit may be given if the credit card used corresponds to a particular bank. The deal may only be given for those customers using a credit card corresponding or associated with a particular bank or financial organization. While the first subscreen may present a network show as previously mentioned, in other embodiments, first subscreen may alternatively present an advertisement or commercial of a product and/or service. In such an event, the organization, based on audio cues obtained from the advertisement, may transmit promotional deals or offers on related products and/or services and complementary products and/or services which may be of interest to a viewer. The organization may transmit such deals to the smart TV for display to the viewer in one or more subscreens.

The deal or offer information may be generated based on audio cues or control signals generated from a user's wireless communication device to the smart TV. When placed in an appropriate mode, the user's wireless communication device (WCD) may monitor the audio transmitted by the smart TV. The audio may be analyzed by the WCD or a server using an audio content recognition application or software. After processing the audio signal using audio content recognition hardware and/or software resident in the WCD or in a server or computer of an organization, the speech content may be determined and used to identify and look-up one or more products and/or services from the organization's database. When the audio signal is processed by the server, the wireless communication device (WCD) may transfer or transmit the audio signal to the server by way of a wireless communication system provided by a wireless carrier. When the audio contains watermarks, such watermarks may be recognized and used as cues to determine a particular product or service associated with the deal or offer. The database of promotional deals or offers may be stored in a memory of the WCD, for example. Otherwise, the database may be stored at a server of the organization. When, the server is used as the database, a request signal may be transmitted by the WCD to the financial institution's server. In response to the signal, the server may transmit the deal or offer directly to the smart TV for display on the second subscreen of the smart TV. The server may transmit the deal or offer information directly to the smart TV or by way of the WCD. The server may transmit the deal information after authentication takes place between the WCD and the smart TV. The WCD and the smart TV may pair with each other in the authentication process. In an embodiment, the deal or offer may also be presented on wireless communication device (WCD) when the user of the WCD selects an appropriate configuration.

FIG. 3 is a block diagram of a suitable computing system environment 300 that may be used to provide data corresponding to one or more products and/or services that may be of interest to a user of the smart TV and/or the wireless communication device previously described in connection with FIG. 1, in accordance with an exemplary embodiment. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 comprises a computing system 301 and one or more computing devices 340, 342. Computing device 340 may comprise a wireless computing device as shown. Computing device 340 may comprise a smartphone such as that described in connection with FIG. 1, for example. Computing device 340 may comprise any portable wireless device configured to run one or more applications for providing a number of features and functionalities. The computing device 340 may comprise a mobile telephone, smartphone, or any other handheld device capable of wireless communication using protocols such as Wi-Fi, Bluetooth, and the like.

Computing device 342 may comprise a digital appliance such as a smart TV that was previously described in connection with FIG. 1, for example. The computing system 301 may include, but is not limited to, one or more personal computers (PCs), one or more server computers (i.e., servers), one or more handheld or laptop devices, one or more multiprocessor systems, one or more microprocessor-based systems, one or more network PCs, one or more minicomputers, one or more mainframe computers, one or more distributed computing environments that include any of the above systems or devices, and the like. As was previously described in connection with FIG. 2, the computing system 301 may comprise the server at an organization. The organization may comprise a financial organization, such as a bank, that wishes to utilize its transactional credit card services. The bank may wish to promote such credit card services to generate credit card transaction fee revenue. The bank may have an agreement with a vendor or supplier to be able sell a product or service at a discounted price. In order to provide the offer or deal to viewers, the financial organization may develop marketing relationships with various vendors and suppliers of products and services.

The computing system environment 300 includes a computing system 301 wherein the processes discussed herein may be implemented. The computing system 301 may comprise a server having a processor 303 for controlling overall operation of the computing system 301 and its associated components, including random-access memory (RAM) 305, read-only memory (ROM) 307, communications module 309, and memory 315. Processor 303 and its associated components may allow the computing system 301 to execute a series of computer-readable instructions related to performing a method for providing deals and offers to computing devices 340, 342. The computing system 301 may receive a request from one or both computing devices 340, 342 to provide deal or offer information to the computing devices 340, 342. The one or more applications 319 may comprise the computer-readable instructions executed by the processor 303 to providing various deals and offers to the viewer. The one or more applications 319 may be stored in the memory 315 and may be executed by the processor 303. Processor 303 may also direct computing system 301 to interact and communicate with computing devices 340, 342. The computing devices 340, 342 may comprise client devices for running one or more client applications under direction of the computing system 301.

The one or more client applications may implement a process for recognizing and determining the audio content of the programming delivered by the smart TV to the user or viewer, for example. One or more products and/or services described or presented in the audio content may be correlated with a database to determine the available offers and promotional deals for presentation to the viewer. The one or more products and/or services comprise athletic wear, athletic equipment, and team related souvenirs when the viewer is watching a sporting event on the smart TV, for example. The viewer and/or user may have downloaded an application into his or her wireless communication device to allow the promotional deals to be received and displayed on his or her wireless communication device. The application may be provided by the organization as a tool for use by its customers using smartphones. The tool may be downloaded into the wireless communication device (WCD) and executed by a processor resident in the WCD.

The computer-readable instructions stored in the RAM 305 or the memory 315 may be executed by the processor 303. A user or operator of the computing system 301 and/or computing devices 340, 342 may provide input data and/or commands for running the one or more applications 319. The input data may be used by the processor to control the execution of the computer-executable instructions stored in memory 315. The input data may also be stored in memory 315 or in a data storage device 321. While FIG. 3 illustrates the one or more applications 319 as being resident in the memory 315, alternatively, the one or more applications 319 may also be resident within the data storage device of the computing devices 340, 342. The memory 315 and/or storage device 321 may comprise one or more drives, such as one or more portable hard disk drives, for example.

The random access memory (RAM) 305 may store data used by the one or more applications while the computing system 301 is executing the computer-executable instructions by the processor 303. The read-only memory (ROM) 307 may store data which is regularly used by the operating system 317. The operating system may be stored in the memory 315.

Computing system 301 typically includes a variety of computer readable media. Computer readable media may be any available media that may be accessed by computing device 301 and may include both volatile and nonvolatile media, removable and non-removable media. By way of example, and not limitation, the computer-readable media may comprise a combination of computer storage media and communication media. The memory 315 and/or data storage device 321 may comprise computer readable media. The computer readable media may comprise one or more hard disk drives, for example. The computing system 301 may be owned and/or operated by any organization involved in sourcing a product and/or service offering or deal. Computer readable media may be implemented in any method or technology for storage of information such as computer readable instructions, data structures, program modules, or other data. Computer readable media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store desired information that can be accessed by the computing system 301 or computing devices 340, 342.

Communications input/output module 309 may include a microphone, keypad, touch screen, and/or stylus through which a user of computing system 301 may provide input, and may also include one or more speakers for providing audio output and a video display device for providing textual, audiovisual and/or graphical output.

Computing system 301 may operate in a networked environment supporting connections to one or more remote computing devices, such as computing devices 340, 342. Each of the computing devices 340, 342 may include many or all of the elements described with regard to computing system 301.

The network connections depicted in FIG. 3 include wide area networks (WANs) 329 but may also include any other types of networks. When used in a WAN networking environment, the computing system 301 may include a modem in the communications module 309 or other means for establishing communications over the WAN 329 by way of the WAN interface 327. It will be appreciated that the network connections shown are illustrative and other means of establishing a communications link between the computing devices may be used. Various well-known protocols such as TCP/IP, Ethernet, FTP, HTTP and the like may be used, and the computing system 301 may be operated in a client-server configuration.

The one or more application programs 319 used by the computing system 301, according to an illustrative embodiment, may include computer-executable instructions for invoking user functionality related to communications including, for example, email, short message service (SMS), downloading and using web based applications. In addition, the application programs 319 may include computer-executable instructions for invoking one or more of the functions, steps, and/or processes described in FIGS. 4A, 4B, and 4C.

Although not required, various aspects of the invention, as described herein, may be embodied as a method, a computing system, or as a computer-readable media storing computer-executable instructions. For example, a computer-readable media may store instructions that, when executed by one or more processors, causes an apparatus or system to perform steps of a method or process in accordance with aspects of the disclosed embodiments. For example, aspects of the method steps disclosed herein may be executed on a processor 303 resident in the computing system 301. Such a processor may execute computer-executable instructions stored on a computer-readable media.

As illustrated, a cellular tower or repeater 344 may be used to communicatively couple the wireless computing device 340 to the computing system 301. The cellular tower 344 may be connected to the Internet 330 as shown in FIG. 3.

FIG. 4A is an operational flow diagram illustrating how audio content recognition is used to automatically display products and services of interest to a viewer on a display of a computing device. The computing device may comprise a digital appliance such as a smart TV as was previously described in connection with FIG. 1. The smart TV may receive programming by way of a set top box provided by a cable operator. The set top box may provide on demand access to programming which may be selected by the viewer using a remote control. The programming may comprise any type of program broadcast from any one of a number of channels, for example. The set top box may also provide an electronic program guide (EPG) for allowing the viewer to select one or more programs over one or more channels. The programs may be recorded using a digital video recorder integrated within the set top box for future use by the viewer. The smart TV may be communicatively coupled to one or more multimedia receivers which may provide multimedia programming via a connection to the Internet. The one or more multimedia receivers may be controlled and operated by a remote control. In one embodiment, the smart TV may comprise a display that is capable of presenting the received programming in a first screen and the information of interest in a second screen. In another embodiment, the smart TV may be capable of presenting the received programming in a first screen and a plurality of information of interest in a plurality of additional screens. Accordingly, the smart TV may provide a multiple split-screen feature for displaying multiple screens in various screen sizes.

At step 404, a viewer of the smart TV may be watching a program such as a football game. While watching the program, the viewer may have access to a wireless communication device, such as a smartphone. While watching the program, the viewer may initiate execution of an audio content recognition (ACR) application using his or her smartphone. In one embodiment, an initialization of the ACR application resident in the wireless communication device may trigger the wireless communication device to analyze and process any audio waveform received. In an alternate embodiment, the viewer may initiate execution of an ACR application resident in a computing device (or server) located at an organization. The server may receive the audio signal generated by the smart TV by way of the wireless communication device. The viewer may initiate execution of the ACR application by making a selection on his or her wireless communication device (e.g., smartphone). The ACR application or software may process the audio waveform to determine its audio content and, in particular, based on a database of products and/or services for sale, determine whether any of these products and/or services might be offered to the viewer as a deal. The deal offered to the viewer may be based on the type of program being watched. For example, the type of deal offered may be based on the subject matter presented in the program and typical viewer characteristics associated with the program being watched. For example, a race car event may initiate one or more deals related to automobiles or accessories related to automobiles. The initialization procedure may comprise inputting authenticating information related to the user of the smartphone. While providing the authenticating information, the user of the smartphone may also provide information indicating the identity of the viewer.

The identity of the viewer and the viewer's customer profile may be used by a database server resident at the organization that promotes the deals and offers. The server may correlate the one or more deals and offers with the viewer's interests found in the profile. While the profile may be accessed at the server, it is contemplated that the most recent profile of one or more viewers may be saved at the wireless communication device (e.g., the smartphone) and may be utilized if the profile database at the server is inaccessible. The authentication procedure may include inputting one or more passwords and or personal identification numbers (PINs) using a keyboard of the smartphone.

Next, at step 408, the wireless communication device may receive the audio using its integrated microphone. The viewer may configure the microphone's sensitivity based on the volume and quality of the audio signal received.

Thereafter, at step 412, the ACR application may utilize one or more signal processing algorithms to analyze the audio and to determine the audio content in the audio signal received by the wireless communication device. The ACR application may also recognize audio watermarks which may have been embedded into the audio signal. Such watermark data may be embedded into an audio track. The audio track may be slightly modified in a defined manner such that the human ear cannot perceive an acoustic difference. The ACR application may be able to filter these audio watermarks from the audio track to determine the type of audio content being transmitted by the smart TV.

At step 416, the ACR application may be able to determine content of the audio signal by way of watermarking or fingerprinting, for example. For example, the audio content may comprise an embedded audio code that indicates the type of program it is associated with. The embedded audio code may be recognized and interpreted by the ACR application. In addition, the ACR application may be capable of comparing the audio characteristics of the audio content to a predetermined library of characteristics to recognize and determine the audio content provided. The ACR application may determine whether the audio content comprises one or more products and/or services offered by an organization. The organization may comprise any institution providing one or more products and/or services which may be of interest to the viewer. The organization may be a manufacturer, a vendor, a distributor, or a service provider. The organization may be a reseller or a financial institution which may have a relationship with the manufacturer, the vendor, the distributor, or the service provider. When the organization is a financial institution such as a bank, the bank may provide an incentive to use its credit card in the purchase by way of giving the viewer a discount or a rebate, for example. The ACR application may also perform an analysis of the characteristics of the audio waveforms. Thereafter, the characteristics of the audio content may be compared to a database of characteristics found in a pre-indexed reference library. The foregoing techniques may be used to determine the content of the audio received by the wireless communication device.

Next, the process continues with step 420, in which the content is correlated with a database stored in the wireless communication device or with a database stored in a server of an organization or institution. The server may comprise the computing system previously described in connection with FIG. 3. The database may comprise a plurality of deals and/or offers associated with a plurality of products and/or services. Each product and/or service offering may be correlated with the content extracted by the ACR application.

Next, at step 424, a determination is made, based on the correlation, whether there is a deal and/or offer to push or present to the viewer. The server may find one or more deals or offers which correspond to the products and/or services described in the television programming. In one embodiment, when the correlation of a product or a service with the content is above a particular threshold value, for example, the wireless communication device may generate an indication that the products and/or services offerings may be of interest to the viewer. As a result of performing these correlations, the product and/or service offerings that may be of interest to the viewer may be transmitted to the smart TV. If it is determined, based on the correlation, that one or more deals/offers should be presented to the viewer, the process proceeds with step 428 of FIG. 4B. Otherwise, the process proceeds with step 440 of FIG. 4C.

At step 428 of FIG. 4B, the viewer may pair the wireless communication device with the smart TV to allow the offerings to be downloaded into the smart TV. The smart TV may communicate with wireless communication device by way of using a wireless communication protocol. Pairing may allow the wireless communication device to obtain the IP address of the smart TV. The pairing may occur by way of using a protocol such as the Bluetooth protocol, for example. The IP address may be transmitted to the server such that the server may be able to transmit the offerings to the smart TV. In some embodiments, the server, by way of the Internet may provide the deals that may be of interest to the viewer. The deals may be received by the smart TV, the set top box, or by a multimedia receiver. As was previously shown in connection with FIG. 1, the set top box and multimedia receiver are connected to the smart TV. Each of the smart TV, the set top box, and the multimedia receiver may have a connection to the Internet.

Next, at step 432, one or more appropriate deals and/or offers are received and displayed on the smart TV. The one or more deals may also be received and displayed on the wireless communication device. The data associated with the deals may be transmitted directly to the smart TV by way of an Ethernet connection. The data may be displayed on a split screen of the smart TV. For example, the data may be displayed on the right portion of the split screen while typical programming may be displayed on the left portion of the split screen. By way of receiving the data, the viewer may learn more about the financial products and/or services the financial organization has to offer and may be inclined to purchase such products and/or services. In some aspects, the deals may also be received by the wireless communication device and displayed on the screen of the wireless communication device.

At step 436, the viewer may review the deals or offers that are presented to him/her. The viewer may participate in the deal by making a selection to purchase one or more of the offers by using a credit card. The viewer may input the credit card number to make a purchase on a particular deal. The purchase may be made using the smart TV or the wireless communication device (WCD).

Next, at step 440, the viewer may make a selection on his or her wireless communication device or the smart TV to display any deals he has previously purchased. In addition to deal history, the viewer may be able to access any history of discounts or any credits he has accumulated through the deal program.

Next, at step 444, the viewer determines if he wishes to participate in additional deals and/or offers. If the viewer wishes to participate in additional deals and/or offers, the process proceeds with step 408 of FIG. 4A. Otherwise the process proceeds with step 448.

At step 448, the viewer terminates the ACR application feature by way of deactivating the ACR application using his or her wireless communication device (WCD).

If it is determined by the server that no deals/offers are appropriate given the programming being watched by the viewer, the process continues with step 452 of FIG. 4C. At step 452, based on the content recognized by the ACR application, the server categorizes and tallies the number of instances a particular product or service has been viewed by a viewer. The server may determine the frequency of occurrence of a particular product or service found in the content (or television program) watched by its viewers. Each of these products and services may be sourced from one or more vendors and suppliers.

Thereafter, at step 456, the server may be programmed using an application to automatically identify potential vendors and/or retailers that would mostly likely be able to provide such products and/or services. The server may determine which of the one or more potential vendors and/or retailers may provide most of the products and/or services that are popular to one or more viewers in a particular geographic area, for example. The organization advertising the deals or offers may seek a sourcing relationship with a vendor, supplier, or retailer providing most of the products and services that it believes its viewers are interested in.

Next, at step 460, a level of interest for one or more products and/or services may determine suitable a vendor, supplier, and/or retailer, that may be of interest to the organization providing the deals or offers. Based on the content viewed by the viewer and other viewers, a level of interest for one or more products and services may be determined and stored in a memory of the server.

At step 464, based on the tally or historical cumulative interest level of a product or service, the server determines if a certain level of interest has been reached for that particular product or service. For example, the level of interest for a particular vendor may be based on the popularity of the television program to its viewers. If the tally exceeds a certain threshold, the process continues with step 468. Otherwise, the process reverts back to step 408.

At step 468, the server may provide notifications/alerts to a development or marketing team to possibly source a deal or offer related to one or more products and/or services related to the content recognized by the ACR application. After notifications/alerts are made to marketing team, the process reverts back to step 408 at FIG. 4A.

In another embodiment, the smart TV may comprise a memory that stores an application that is capable of translating an electronic waveform associated with the audio. When initiated by a viewer, the smart TV may internally process the electronic waveform using the application to determine the types of products and/or services that are presented by the television programming. The viewer may initiate processing of the electronic waveform by the smart TV by way of using a remote control, for example. The smart TV may automatically determine one or more products and/or services, based on the television programming delivered to the viewer which may be of interest to the viewer. Processing of the electronic waveform may be initiated by inputting authenticating information related to the user of the smart TV. While providing the authenticating information, the user of the smartphone may also provide information indicating the identity of the viewer of the television programming. By indicating the identity of the viewer, the server at the organization may be better able to correlate the one or more deals and offers with the viewer's interests. The authentication procedure may include inputting one or more passwords and or personal identification numbers (PINs) by using a screen visible keyboard on the smart TV.

The foregoing presents a simplified summary of the disclosure in order to provide a basic understanding of some aspects. It is not intended to identify key or critical elements of the invention or to delineate the scope of the invention. Although not required, the various aspects described herein may be embodied as a method, a data processing system, or as a computer-readable medium for storing computer-executable instructions that are capable of being executed by a processor of a computer system. Aspects of the invention have been described in terms of illustrative embodiments thereof. Numerous other embodiments, modifications, and variations within the scope and spirit of the disclosed invention are possible from a review of this entire disclosure. For example, the steps illustrated in the illustrative figures may be performed in other than the recited order, and that one or more steps illustrated may be optional in accordance with aspects of the disclosure. While some embodiments have been described with respect to specific examples, other embodiments include numerous variations and permutations of the above described systems and techniques.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A system comprising:
   at least one processor; and
   at least one memory for storing computer executable instructions, wherein execution of said computer executable instructions by said at least one processor causes said computing device to perform a method comprising:
   receiving audio including speech content corresponding to a multimedia program, said audio generated by a multimedia viewing device;
   processing said audio to determine the speech content of said audio;
   correlating said speech content determined from the audio with a product or service offering;
   correlating the product or service offering with a database comprising a plurality of promotional deals;
   generating a nonempty proper subset of said plurality of promotional deals based on said correlating of the product or service offering with the database comprising the plurality of promotional deals, the nonempty proper subset including two or more promotional deals; and
   transmitting said subset to said multimedia viewing device from which the audio was generated, wherein said subset is displayed on a subscreen of said multimedia viewing device.

2. The system of claim 1 wherein said processing includes comparing audio characteristics of said speech content to a database of characteristics found in a reference library.

3. The system of claim 1 wherein said processing includes filtering watermark data embedded in said audio to determine a type of audio content being transmitted by said multimedia viewing device.

4. The system of claim 1 wherein at least one of said plurality of promotional deals provides a discounted price.

5. The system of claim 1 wherein at least one of said plurality of promotional deals provides a monetary credit to a credit card account of a purchaser when a purchase of a product or service associated with said subset is made by said purchaser using a credit card associated with a bank.

6. The system of claim 5 wherein said purchase generates credit card transaction fee revenue.

7. The system of claim 1 wherein execution of said computer executable instructions by said at least one processor further causes said computing device to perform:
   determining whether said speech content comprises at least one of: one or more products and one or more services, wherein the frequency of occurrence of each of said at least one of: said one or more products and said one or more services in said speech content of said audio determines one or more suitable vendors to source said at least one of: said one or more products and said one or more services.

8. A method comprising:
receiving audio including speech content corresponding to a multimedia program, said audio generated by a multimedia viewing device;
processing said audio to determine the speech content of said audio;
correlating said speech content determined from the audio with a product or service offering;
correlating the product or service offering with a database comprising a plurality of promotional deals;
generating a nonempty proper subset of said plurality of promotional deals based on said correlating of the product or service offering with the database comprising the plurality of promotional deals, the nonempty proper subset including two or more promotional deals;
transmitting said subset to said multimedia viewing device from which the audio was generated, wherein said subset is displayed on a subscreen of said multimedia viewing device, wherein said receiving, processing, correlating, generating, and transmitting is performed by a server located in a bank.

9. The method of claim 8 wherein said processing includes comparing audio characteristics of said speech content to a database of characteristics found in a reference library.

10. The method of claim 8 wherein said processing includes filtering watermark data embedded in said audio to determine a type of audio content being transmitted by said multimedia viewing device.

11. The method of claim 8 wherein at least one of said plurality of promotional deals provides a discounted price.

12. The method of claim 8 wherein at least one of said plurality of promotional deals provides a monetary credit to a credit card account of a purchaser when a purchase of a product or service associated with said subset is made by said purchaser using a credit card associated with a bank.

13. The method of claim 12 wherein said purchase generates credit card transaction fee revenue.

14. The method of claim 8 further comprising:
determining whether said speech content comprises at least one of: one or more products and one or more services, wherein the frequency of occurrence of each of said at least one of: said one or more products and said one or more services in said speech content of said audio determines one or more suitable vendors to source said at least one of: said one or more products and said one or more services.

15. A non-transitory computer-readable storage media having stored thereon, a computer program having at least one code section for processing data, said at least one code section being executable by a processor of a computing device for causing said computing device to perform steps comprising:
receiving audio including speech content corresponding to a multimedia program, said audio generated by a multimedia viewing device;
processing said audio to determine the speech content of said audio;
correlating said speech content determined from the audio with a product or service offering;
correlating the product or service offering with a database comprising a plurality of promotional deals;
generating a nonempty proper subset of said plurality of promotional deals based on said correlating of the product or service offering with the database comprising the plurality of promotional deals, the nonempty proper subset including two or more promotional deals; and
transmitting said subset to said multimedia viewing device from which the audio was generated.

16. The non-transitory computer-readable storage media of claim 15, wherein said processing includes comparing audio characteristics of said speech content to a database of characteristics found in a reference library.

17. The non-transitory computer-readable storage media of claim 15 wherein said processing includes filtering watermark data embedded in said audio to determine a type of audio content being transmitted by said multimedia viewing device.

18. The non-transitory computer-readable storage media of claim 15 wherein at least one of said plurality of promotional deals provides a monetary credit to a credit card account of a purchaser when a purchase of a product or service associated with said subset is made by said purchaser using a credit card associated with a bank.

19. The non-transitory computer-readable storage media of claim 18 wherein said purchase generates credit card transaction fee revenue.

20. The non-transitory computer-readable storage media of claim 15 wherein said at least one code section further causes said computing device to perform at least:
determining whether said speech content comprises at least one of: one or more products and one or more services, wherein the frequency of occurrence of each of said at least one of: said one or more products and said one or more services in said speech content of said audio determines one or more suitable vendors to source said at least one of: said one or more products and said one or more services.

* * * * *